(12) United States Patent
Whited (10) Patent No.: US 8,681,156 B2
(45) Date of Patent: Mar. 25, 2014

(54) SYSTEMS AND METHODS FOR INTERACTIVE VECTORIZATION

(75) Inventor: Brian Whited, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 403 days.

(21) Appl. No.: 13/040,837

(22) Filed: Mar. 4, 2011

(65) Prior Publication Data

US 2012/0223949 A1 Sep. 6, 2012

(51) Int. Cl.
*G06T 11/20* (2006.01)

(52) U.S. Cl.
USPC ......................................... 345/442; 345/443

(58) Field of Classification Search
USPC ................................................. 345/442, 443
See application file for complete search history.

(56) References Cited

U.S. PATENT DOCUMENTS

| | | | | |
|---|---|---|---|---|
| 6,304,677 | B1 * | 10/2001 | Schuster | 382/264 |
| 6,771,266 | B2 * | 8/2004 | Lui et al. | 345/442 |
| 7,034,831 | B2 * | 4/2006 | Wenzel et al. | 345/442 |
| 7,969,440 | B1 * | 6/2011 | Polyakov et al. | 345/442 |
| 8,159,494 | B2 * | 4/2012 | Lee et al. | 345/442 |
| 2002/0093501 | A1 * | 7/2002 | Lui et al. | 345/442 |
| 2006/0290698 | A1 * | 12/2006 | Wang et al. | 345/442 |
| 2008/0143726 | A1 * | 6/2008 | Lee et al. | 345/442 |
| 2009/0027398 | A1 * | 1/2009 | Frisken | 345/442 |
| 2009/0284532 | A1 * | 11/2009 | Kerr et al. | 345/442 |
| 2010/0045679 | A1 * | 2/2010 | Borac | 345/442 |
| 2011/0164041 | A1 * | 7/2011 | Miura | 345/442 |

OTHER PUBLICATIONS

Baran, et al., "Sketching clothoid splines using shortest paths", Eurographics, *Computer Graphics Forum*, 2010, vol. 29, No. 3, pp. 655-664.
Frisken, S.F., "Sketching curves with immediate feedback," *ACM SIGGRAPH 2007 Sketches*, SIGGRAPH '07, ACM, New York, 2007, 1 page.
Levien, et al., "Interpolating splines: Which is the fairest of them all?," *Computer-Aided Design and Applications*, 2010, pp. 91-102.
Pratt, V., "Direct least-squares fitting of algebraic surfaces," *SIGGRAPH Comput. Graph.*, Aug. 1987, vol. 21, pp. 145-152.
Rossignac, et al., "J-splines," *Comput. Aided Des.*, Oct. 2008, vol. 40, pp. 1024-1032.
Taubin, G., "A signal processing approach to fair surface design," *SIGGRAPH '95*, ACM, 1995, New York, pp. 351-358.
Wang, et al., "Fitting B-spline curves to point clouds by curvature-based squared distance minimization," *ACM Trans. Graph.*, Apr. 2006, vol. 25, pp. 214-238.

* cited by examiner

*Primary Examiner* — M Good Johnson
(74) *Attorney, Agent, or Firm* — Kilpatrick Townsend & Stockton LLP (57) ABSTRACT

Embodiments facilitate the production of a B-spline curve that approximates a set of N-dimensional (position, pressures, tilt, etc.) discrete input samples recorded by a digital input device. Iterative noise filtering and B-spline subdivision processes are performed within a dynamic window of recent samples. A vector representation is produced at interactive rates after each new sample is captured, thus producing results that are comparable to what the same artist would expect if drawing on paper.

25 Claims, 9 Drawing Sheets

SYSTEMS AND METHODS FOR INTERACTIVE VECTORIZATION

BACKGROUND

The present invention relates to input capture in general and in particular to interactively generating vector representations of a drawing.

Input capture involves the conversion of user inputs into a computer-readable form, typically involving a user input device electronically coupled to a processor that executes software instructions or other processing to generate the computer-readable and stored representation of what the user intended to input. Where the input is text, a keyboard might be used and the user intent is often easy to determine, based on the keys pressed and the order pressed. However, where the user input is drawing elements, such as lines, curves, and other drawing expressions, it can be more difficult to generate the stored representation that accurately reflects the user's intended input.

Of course, digital input capture can be set at a very high resolution, such as capturing location of an electronic pen very frequently, along with pressure, rotation, etc. to capture exactly what movements the user made, to the resolution of some small quantization and sampling error, but even that might not be what the user intended and that might not be usable for many purposes. For example, if the samples are just points at which locations are measured, there may be too many points to work with and the points might be disjoint and at some resolution provide a very disjointed input.

Such problems are well known and there have been some proposed solutions, such as to have a processor evaluate the sampled user inputs from an input device and attempt to generate vector representations based on the user's inputs after the user is done drawing. Digital curve capture has become an important means of computer input in recent years as tablets and stylus-based devices have become more pervasive. The conversion of user input into digital curves and the use of those digital curves have a wide range of applications, including drawing, painting, gesturing, signature capture, motion capture. While curve capture is often described with reference to capture of curves drawn on a two-dimensional surface, curve capture can also be captured as input in three dimensions (or four, if the time dimension is considered).

Digital input devices including computer mice, stylus-based tablets, 3D spatial trackers and touch screens supply discrete samples as the user draws a continuous path. It may be the case that the samples comprise pen location, tilt (e.g., pen angle of attack relative to the "paper" of the input device), pen rotation (relevant when the pen tip is not symmetrical), pressure and possibly other sample components. In many examples, the samples are taken at a regular interval and that is the example used herein, but samples might be taken at irregular intervals. For example, a sample might be taken every 0.10 seconds or every 0.5 seconds regardless of activity, or might be taken at a variable rate that depends on user activity or user specification of a sample rate.

In any case, when samples are taken, they can be stored as raw data, but many applications find the data more useful if it is processed to generate curve/intent data indicating the curves that the user likely intended. Simply connecting the sampled points with linear segments is often not an acceptable solution, such as when the discontinuous result does not represent the continuous path intended by the user. Therefore, what is often desired is a smooth, continuous curve that fits to the input samples in such a way that the curve attempts to reproduce the intended path of the user's drawing.

There are known processes for producing such curves, and digital drawing applications such as the Adobe Photoshop™ program, the Adobe Illustrator™ program, the Inkscape™ program, the Autodesk Sketchbook Pro™ program, Toonboom Harmony™ and the like, employ such a process, in order to avoid producing unpleasant linear segments. The stored output of such processes is sometimes referred to as "vector artwork" to distinguish from the sampled dots of the input data.

Vector artwork is a popular choice for digital art creation due to its resolution-independent nature. The input curves are explicitly stored, allowing the final drawing to be scaled to various resolutions without loss of quality. This permits high-quality viewing on a variety of differently sized devices. There is a large body of work related to generating a smooth or "fair" curve to a sequence of input samples. Most of these approaches, however, do not address the problem of dealing with a sequence of input samples that is being appended in real-time. One typical standard solution is for a processor to generate linear segments between the input samples as the user draws, possibly displaying those to the user on a display device as the user draws, and then generate a smooth curve to the samples once the user finishes the current stroke and display that smooth curve. This has the implication that when the user lifts the pen after creating a stroke, the processor will visually change what is displayed, but the computed curve might no longer represent what the artist intended and require the artist user to recreate a long input sequence.

Most state-of-the-art algorithms require a complete set of static input samples in order to produce a result. This is primarily due to the complexity of algorithms that cannot be easily applied interactively every time a new sample is recorded. The recent work of [Baran] outlines an algorithm that produces curves comprised of clothoid splines. However, the processing time needed to produce a result is limiting in that it cannot be applied in real-time.

Some approaches may generate a curve as the samples are recorded. These approaches fit parametric curves (e.g., cubic Beziers), one at a time, while the user draws. Every time a new input sample is obtained and added to the raw data, the processor computes an updated current Bezier curve such that the updated current Bezier curve fits a range of recent samples. Once the fitting error passes a defined threshold, the current Bezier curve is frozen and a new Bezier curve is created with its starting point and tangent now fixed in order to connect smoothly to the previous. The resulting final curve is a smooth piece-wise $C^1$ Bezier curve. Curves may be fit by reducing the squared distance of the current Bezier curve to the piecewise linear segments between input samples, as opposed to the distance of the input samples to the current Bezier curve. This is an optimization allowing the algorithm to be interactive but comes at the cost of potentially misrepresenting the input if samples are far apart.

REFERENCES

Examples of previous approaches and general description of problems and terminology in this space can be found in the literature, such as the references cited below:

[Baran] Baran, I., Lehtinen, J., Popovic, J., "Sketching clothoid splines using shortest paths", Eurographics (*Computer Graphics Forum*) 29, 3 (2010), pp. 655-664.

[Frisken] Frisken, S. F., "Sketching curves with immediate feedback", *ACM SIGGRAPH* 2007 *Sketches* (New York, N.Y., USA, 2007), SIGGRAPH '07, ACM.

[Levien] Levien, R., Sequin, C. H., "Interpolating splines: Which is the fairest of them all?", *Computer-Aided Design and Applications* (2010), pp. 91-102.

[Pratt] Pratt, V., "Direct least-squares fitting of algebraic surfaces", *SIGGRAPH Comput. Graph.* 21 (August 1987), pp. 145-152.

[Rossignac] Rossignac, J., Schaefer, S., "J-splines", *Comput. Aided Des.* 40 (October 2008), 1024-1032.

[Taubin] Taubin, G., "A signal processing approach to fair surface design", in *SIGGRAPH '95* (New York, N.Y., USA, 1995), ACM, (Previously Presented), pp. 351-358.

[Wang] Wang, W., Pottmann, H., Liu, Y., "Fitting B-spline curves to point clouds by curvature-based squared distance minimization", *ACM Trans. Graph.* 25 (April 2006), pp. 214-238.

SUMMARY

In view of the foregoing, systems and methods are provided for interactively generating vector representations (e.g. generated curves) that accurately reflects human motion. In particular, embodiments facilitate, in real-time or in substantially real-time, the generation of hand-drawn vector artwork in situations where intent of the artist is to be captured.

In some embodiments, a user input device captures raw user inputs, and a processor coupled to the user input device performs noise filtering and uniform B-spline subdivision processing to produce a vector representation at interactive rates, which can then be stored in computer-readable media and/or sent to a display to be presented to the user. In some cases, the input device and the output device are integrated so that a resulting vector representation is displayed at or near where the user is drawing.

Due to linearly increasing complexity as samples are recorded, or for other reasons, the noise filtering and uniform B-spline subdivision processing might not be executed on the entire set of received input samples. Instead, an adaptive analysis window including a varying number of samples might be determined. The size of the adaptive analysis window might be a size sufficient to perform the noise filtering and subdivision processing. In some embodiments, the analysis window may include the most recently received input samples. Within the window, the samples may be filtered and subdivided. Following processing of the samples, the size of the analysis window may be modified or updated.

In some embodiments, as a result of the processing described above, a generated vector representation can be the same as if the subdivision were done on all samples simultaneously, thus preserving the continuity of the B-spline.

In one implementation, an electronic device or computer can be configured to receive, from a digital input device, at least one input sample from a set of input samples; determine an analysis window to be used in the filtering of at least some of the set of input samples, where the analysis window has a leading edge and a trailing edge such that the size of the analysis window is a distance between the leading edge and the trailing edge, and where the determining includes at least determining a position for the trailing edge; filter the at least some of the set of input samples based on the analysis window to generate a modified set of input samples; generate a vector representation based on the modified set of input samples; determine an updated size for the analysis window; and output the vector representation.

In some variations, the filtering of input samples can include a two-step Gaussian smoothing process. The Gaussian smoothing process can include, in some cases, a first pass that moves an input sample towards an average position of a set of neighbor input samples by a weight $\lambda$ and a second pass that moves an input sample away from the average position of a set of neighbor input samples by a weight $\mu$.

In certain variations, the analysis window can include at least some of the most recently received input samples. Filtering based on the analysis window can include filtering only those input samples within the analysis window. Filtering can include moving the position of at least one input sample in the at least some of the set of input samples. Determining the updated size for the analysis window can include determining whether an input sample within the window has moved less than a threshold distance during the filtering, and reducing the size of the analysis window if it is determined that the input sample has moved less than the threshold distance. Generating the vector representation based on the set of input samples can include the use of a B-spline subdivision process.

In still more variations, the digital input device can be a computer mouse, a trackball, a track pad, a stylus based tablet, a digital pen, a joystick, a wireless remote, a touch screen, a voice command system, a three dimensional input device, a force feedback device, an eye tracking system, and a three dimensional tracking system. An input sample captured by the input device can include position information, pressure information, and/or tilt information.

BRIEF DESCRIPTION OF THE DRAWINGS

FIGS. 6(*a*)-6(*i*) are illustrations showing the different processing stages performed on an exemplary set of input samples according to the process shown in FIG. 2.

DETAILED DESCRIPTION OF EMBODIMENTS

In the following description, for the purposes of explanation, numerous specific details are set forth in order to provide a thorough understanding of the present invention. It will be apparent, however, to one skilled in the art that the present invention may be practiced without some of these specific details.

The present disclosure describes systems and methods for facilitating the generation of vector representations that accurately reflect human motion and/or intent. More specifically, embodiments enable the generation of vector representations that are parametric in nature and smooth enough to produce a pleasing result when globally scaled, but not so smooth such that the human character is lost. The vector representations that are generated are close to the continuous curve that an artist would draw on paper. Embodiments further render such vector representations on-the-fly (e.g., as the artist is drawing). Implementations might include a user input device, a processor, programming instructions and a display, however other implementations might include all of the functionality in computer-readable media having thereon stored program instructions that, when eventually provided to a system that is capable of taking in user input, processing those program instructions and providing display output (if used). One of ordinary skill in the art will recognize, after reading this disclosure, that functionality described herein can be implemented in software and/or hardware and executed accordingly.

One of ordinary skill in the art will also recognize, after reading this disclosure, that reference to real-time processing need not be limited to instantaneous processing, but processing that occurs fast enough to provide a satisfactory response time for the user's needs. For example, a user might not be satisfied with a response time of 10 seconds from user input to the generation of a vector representation, but on the other end, the user might not care about some tens (or possibly hundreds, or more) of milliseconds of delay and might still perceive that as being real-time responsiveness.

Embodiments facilitate the generation of vector representations by performing noise filtering and B-spline subdivision. Further, due to linearly increasing complexity as input samples are recorded or captured, embodiments might avoid processing an entire set of input samples. Rather, an adaptive analysis window is used that includes a varying number of the most recently recorded input samples. Within this window, the input samples are filtered and subdivided. In some embodiments, the subdivision is performed in a manner such that a resulting vector representation is the same as if it were generated based on all samples simultaneously. As a result, for example, when using quintic B-spline subdivision, the $C^4$ continuity is preserved.

For example, in a very specific embodiment, a user may operate a digital input device, such as a digital pen, to provide discrete input samples to a computer. As the computer receives the input samples, noise from a set of the most recently received input samples are filtered. Following filtering, a subdivision process is performed to generate a vector representation. The vector representation may thereafter be transmitted to a monitor for the user to view. The computer may update the vector representation as more input samples are received from the digital input device (e.g., as the user continues to draw a particular stroke).

As used herein, a sample input may refer to any collection of information provided by a digital input device, such as position information, pressure information, tilt information, and/or the like.

By processing input samples in the manner described herein, embodiments allow for low computational costs, adaptability, ease of implementation and robustness in vectorization. Low computational cost and adaptability are essential for enabling interactive execution while leaving sufficient computational resources for rendering results interactively (e.g., displaying an updated vector representation as drawing occurs).

Examples of the concepts and disclosures provided above will now be further explained with reference to the figures.

System

Figure 1:
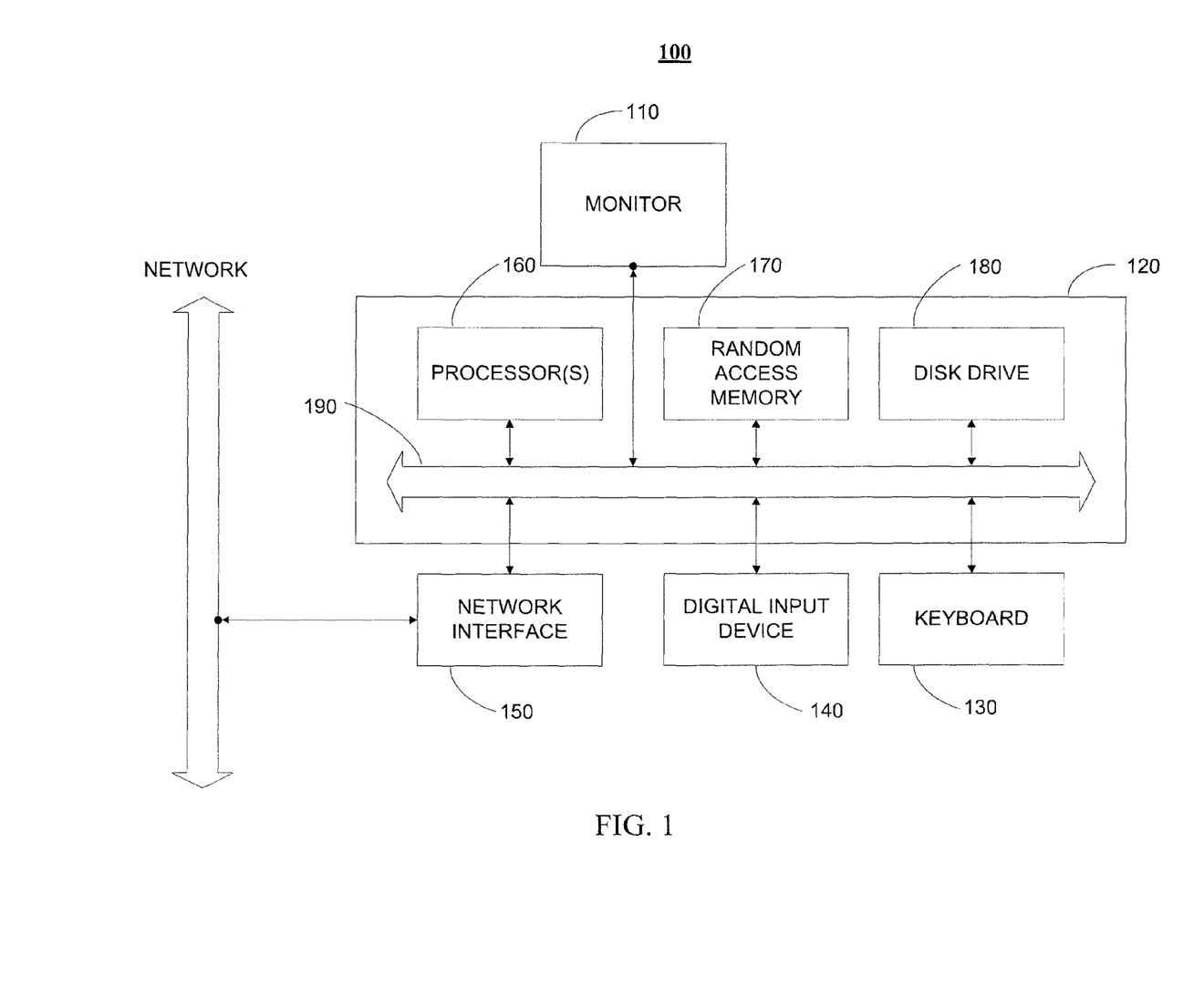
FIG. 1 is a simplified block diagram of an interactive vectorization system according to one embodiment.

FIG. 1 is a simplified block diagram of an example computer system 100 for interactive vectorization according to one embodiment. In the presently described embodiment, computer system 100 typically includes a monitor 110, a computer 120, a keyboard 130, a digital input device 140, computer interfaces 150, and/or the like.

Computer 120 can include hardware and software elements configured for interactive vectorization. Computer 120 may be embodied as a single computing device or a set of one or more computing devices. Some examples of computing devices are desktop computers, laptops, workstations, mainframes, servers, cluster computing systems, grid computing systems, cloud computing systems, embedded devices, computer graphics devices, gaming devices and consoles, tablet devices (e.g., Apple Inc.'s iPad™ tablet), multi-function devices, mobile phones, consumer electronic devices having programmable processors, and/or the like.

Computer 120 may be configured to process input samples and generate vector representations. For example, computer 120 may be configured to receive input samples, and perform noise filtering and vectorization processes within a dynamic window in order to generate a vector representation. In some embodiments, a vector representation is generated at interactive rates after each new input sample is received. For example, a vector representation may be generated at a rate so that it appears to a user that the vector representation is being updated in substantially real-time or on-the-fly. By generating a vector representation at interactive rates, feedback can be immediately relayed to a user.

In various embodiments, display/monitor 110 may be embodied as a CRT display, an LCD display, a plasma display, a direct-projection or rear-projection DLP, a microdisplay, and/or the like. In various embodiments, monitor 110 may be used to visually display user interfaces, images, lines, curves, and/or the like as well as being part of an interactive environment that accepts user inputs, etc. For example, monitor 110 may display a vector representation based on user interaction with a digital input device, such as a mouse, drawing tablet, etc.

In various embodiments, digital input device 140 may be embodied as a computer mouse, a trackball, a track pad, a stylus based tablet, a digital pen, a joystick, a wireless remote, a touch screen (e.g., LCD based touch screen), a voice command system, a three dimensional input device, a force feedback device, an eye tracking system, a three dimensional tracking system and/or the like. Digital input device 140 typically allows a user to provide inputs, such as lines, curves, and/or the like. For example, digital input device 140 may be configured to generate or capture input samples based on interaction with a user. Illustratively, a user may move a mouse along a surface. As the mouse is moved, discrete input samples may be captured.

In some embodiments, digital input device 140 and display/monitor 110 may be combined or integrated into a single device. For example, computer system 100 may include an LCD-based touch screen that displays images and also captures user input. Illustratively, a user may tap his or her finger on a region of the touch screen's surface that displays an icon. The touch screen may capture the tap and, in response, start a software application associated with the icon. Upon starting the software application, a graphical user interface for the application may be displayed on the touch screen for presentation to the user.

Embodiments of computer interfaces 150 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 150 may be physically integrated on the motherboard of computer 120 and/or include software drivers, or the like.

In various embodiments, computer 120 typically includes familiar computer components such as a processor 160, and memory storage devices, such as a random access memory (RAM) 170 and disk drives 180. System bus 190 may interconnect the aforementioned components. RAM 170 or other memory might hold computer instructions to be executed by one or more processors as a mechanism for effecting some functionality described herein that is implemented in software. In one embodiment, computer 120 includes one or more Core™ microprocessors from Intel, one or more Phenom™ microprocessors from AMD, one or more microprocessors from ARM, etc. Further, in the present embodiment, computer 120 typically includes a suitable operating system, such as a UNIX-based operating system.

RAM 170 and disk drive 180 are examples of computer-readable tangible media configured to store embodiments of the present invention including computer-executable code implementing techniques described herein, data such as image (e.g., files containing drawings, lines, curves, etc.) files, object/scene models including geometric descriptions of objects, images, metadata about images and user inputs and suggestions, procedural descriptions, a rendering engine, executable computer code, and/or the like. Other types of tangible media may include magnetic storage media such as floppy disks, networked hard disks, or removable hard disks, optical storage media such as CD-ROMS, DVDs, Blu-ray™ discs, holographic memories, and/or bar codes, semiconductor memories such as flash memories, read-only-memories (ROMS), battery-backed volatile memories, networked storage devices, and the like.

In various embodiments, computer system 100 may also include software that enables communications over a network such as the HTTP, TCP/IP, RTP/RTSP protocols, and the like. In alternative embodiments of the present invention, other communications software and transfer protocols may also be used, for example IPX, UDP and/or the like.

FIG. 1 is representative of a computer system capable of embodying embodiments of the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other microprocessors are contemplated, such as Xeon™, Pentium™ or Itanium™ microprocessors from Intel; Turion™ 64 or Opteron™ microprocessors from Advanced Micro Devices, Inc; and the like. Further, other types of operating systems are contemplated, such as Vista™, Windows XP™, or Windows 7™ or the like from Microsoft Corporation, Solaris™ from Sun Microsystems, OS X™ or the like from Apple Inc., Linux, Unix, or the like. In still other embodiments, the techniques described above may be implemented upon a chip or an auxiliary processing board. Many types of configurations for computational devices can be used to implement various methods described herein. Further, processing components having different levels of computational power, e.g., microprocessors, graphics processors, RISC processors, embedded processors, or the like can also be used to implement various embodiments.

Vectorization Process

Examples of a process that may be used for generating a vector representation based on a set of sample inputs will now be described.

Figure 2:
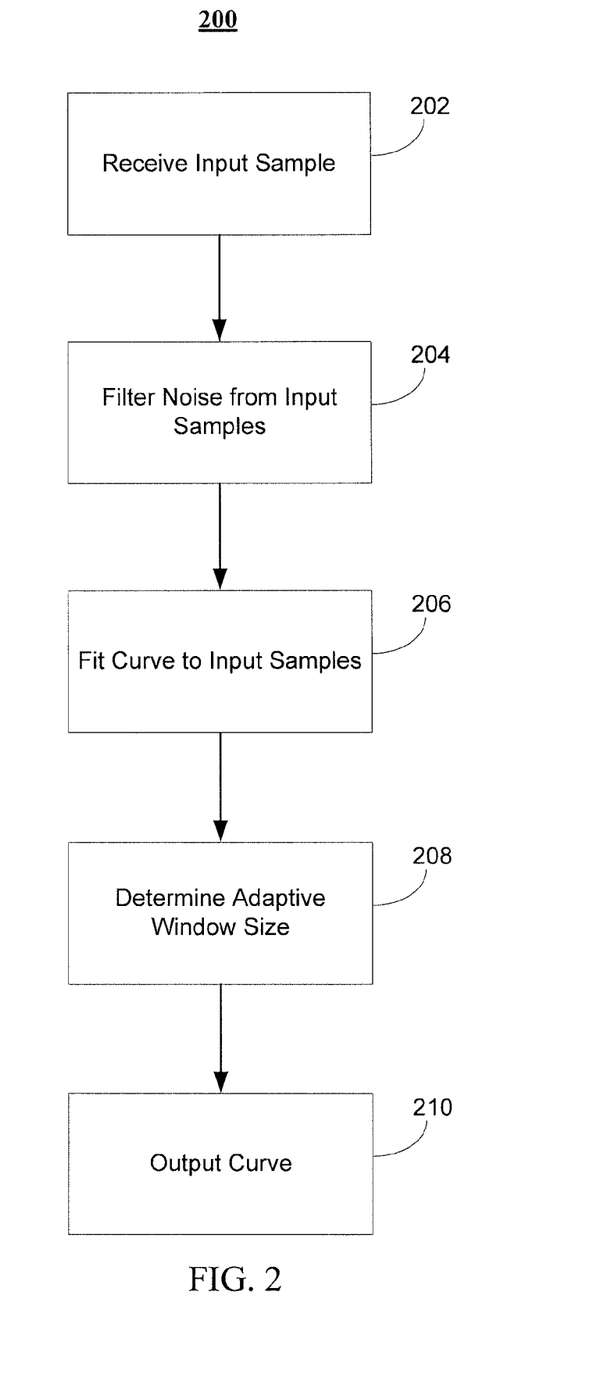
FIG. 2 is a flowchart of a process for interactively generating a vector representation according to one embodiment using the system shown in FIG. 1.

An embodiment of a workflow process 200 is illustrated in FIG. 2. It should be understood that process 200 is tied to a computer system and/or computing device that allows for user interaction and has an engine that can perform many computations per second as the process 200 is not amenable to be done without some sort of computational assistance. Process 200 can be performed by, for example, computer system 100.

As shown in FIG. 2, one or more input samples are received. Thereafter, the input samples are filtered for noise. In particular, a fairing process, which includes a 2-pass Gaussian smoothing process, may be performed. Following filtering, a vector representation is generated based on the filtered input samples. In particular, a subdivision process may be performed in order to produce a B-spline for the entire set of samples being drawn. In some embodiments, the input samples that are processed may be constrained to the most recent input samples that fall within an adaptive analysis window.

Input Sample Receipt

The process 200 begins at step 202. In particular, computer 120 of computer system 100 receives one or more input samples. In some embodiments, the input sample may be received from digital input device 140. For example, digital input device 140 may generate the input samples in response to interaction with a user and transmit the generated input samples to computer 120. Illustratively, digital input device 140 may be a stylus-based tablet, such as a tablet manufactured by Wacom Co. During operation, a user may move a stylus pen along the tablet. Sensors embedded in the tablet may capture the movement of the stylus pen, generate one or more discrete input samples, and transmit the input samples to computer 120 for processing.

Noise Filtering

At step 204, processor 160 of computer 120 performs a fairing process to filter noise from the one or more input samples received at step 202 and/or from previously received input samples. More specifically, certain types of digital input devices can introduce noise or quantization problems that affect an outputted vector representation. For example, computer mice often quantize input to integer coordinates relative to a screen resolution. Other possible sources of noise may include time separation of the input samples and an unsteady user hand. In other examples, the input devices might be oversensitive and pick up noise and treat it as additional marks made by the user.

To overcome noise and quantization problems, processor 160 may filter noise from the input samples using a fairing process based on an extension of Taubin's fairing algorithm [Taubin]. In some embodiments, the fairing process filters input samples as new samples are received and constrains the samples within a defined constraint distance, $\epsilon_C$, from their original positions. By performing such processing, high frequency noise is removed while the global shape and size of the input samples are preserved. Processing input samples in this manner is additionally relatively simple to implement and adapts well to a variable subset of input samples.

In some embodiments, the fairing process may include a two-pass Gaussian smoothing process. The two-pass Gaussian smoothing process may move each input sample towards the average of its neighbors by a weight, $\lambda$, and thereafter away from the average of its neighbors by a weight, $\mu$.

The two-pass Gaussian smoothing process, which approximates a low-pass filter, uses three parameters: $\lambda$, $\mu$, and $k_{PB}$. The process further requires that the three parameters satisfy the Equation 1, where $k_{PB}$ is the pass band frequency defined by Taubin for deciding which frequencies are to be considered or determined to be high.

$$\frac{1}{\lambda} + \frac{1}{\mu} = k_{PB} > 0 \quad \text{(Eqn. 1)}$$

In some embodiments, the value of $k_{PB}$ may be tuned to ensure that a vector representation is accurately generated. In particular, the poor assignment of a $k_{PB}$ value can adversely affect the characteristics of a generated vector representation. For example, if $k_{PB}$ is set to a value that is too small, a generated vector representation may exhibit shrinking Conversely, if $k_{PB}$ is set to a value that is too large, a generated vector representation may exhibit expansion. As a result, although the fairing process is generally stable relative to the parameter $k_{PB}$, the value of $k_{PB}$ may be tuned based on one or more operating characteristics of digital input device 140. For example, the value of $k_{PB}$ may be tuned based on the input frequency of digital input device 140. By tuning the value of $k_{PB}$, a resulting vector representation may more accurately reflect user intent.

Tuning of the parameter $k_{PB}$ may be performed automatically, semi-automatically, or manually. Illustratively, processor 160 may automatically determine the values for $k_{PB}$ and $\lambda$. In some embodiments, the values for $k_{PB}$ and $\lambda$ may be tuned to the values of 0.002 and 0.6 respectively for high resolution input at ~150 samples/second. For less accurate input, such as a mouse at 60 samples/second, values of 0.03 and 0.6 are more appropriate. For even slower input at approximate 30 samples/second, values of 0.05 and 0.6 work better.

As part of the fairing process, endpoints may be fixed because discrete Laplacians of the endpoints are undefined. All other input samples, $x_i$, may be constrained to be within a constraint distance, $\epsilon_C$, from their original locations, $x_{i_0}$. By fixing endpoints and constraining other input samples, the noise filtering process is prevented from altering a vector representation in such a way as to violate requirements with respect to user intent. After each fairing iteration, a discrepancy $d|x_i-x_{i_0}|$ is computed. If the discrepancy is less than the constraint distance, i.e., $d > \epsilon_C$, then a sample is moved towards the corresponding original input sample, $x_{i_0}$, as illustrated in Equation 2.

$$x'_i = x_i + (x_i - x_{i_0})(d - \epsilon_C) \quad \text{(Eqn. 2)}$$

In some embodiments, the value for the constraint distance may be tuned based on the characteristics of digital input device 140. Illustratively, for high-resolution digital input devices, such as tables manufactured by Wacom Co., the constraint distance might be tuned to a value of 0.25. For noisy and/or quantized digital input devices, such as a computer mouse, the constraint distance might be tuned to a value in the inclusive range of 1.5-2.0. Tuning of the constraint distance might be performed automatically, semi-automatically, or manually. Illustratively, a user may manually provide or input a value for the constraint distance to computer 120.

Figure 3:
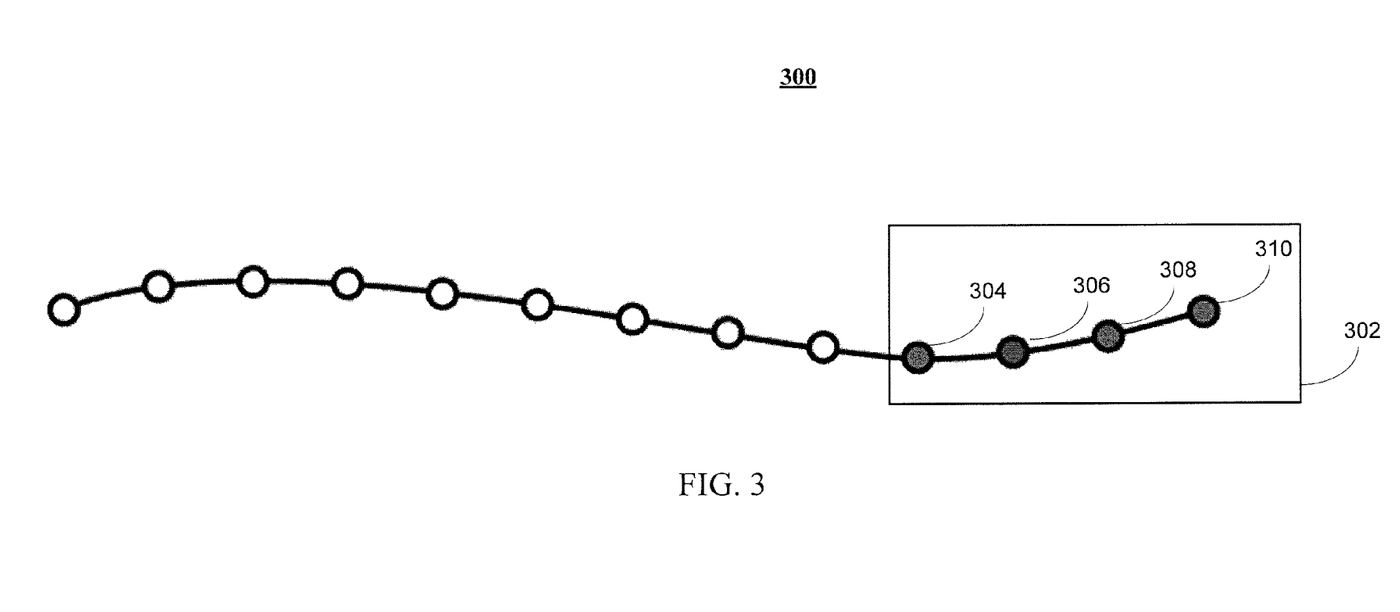
FIG. 3 is an illustration of an exemplary set of input samples received from a digital input device.

In some embodiments, in order to maintain computational efficiency, processor 160 may perform the fairing process on a range or window of input samples. The window, defined herein as W, may include the most recent w input samples $(w_0, w_1, \ldots, w_{w-1})$ received from digital input device 140, where $w_{min} \leq w \leq w_{max}$. Illustratively, FIG. 3 shows an exemplary set of input samples received from digital input device 140. Window 302 includes the most recently received input samples: input sample 304 ($w_0$), input sample 306 ($w_1$), input sample 308 ($w_2$), and input sample 310 ($w_3$). In some embodiments, $w_{min}=16$ and $w_{max}=100$. In certain embodiments, a window may be a size sufficient to generate a vector representation that is the same or similar to the representation that would be generated if the entire set of received input samples were processed.

In certain embodiments, a window may include a leading and trailing edge. The position of the leading edge may be located at the position of the most recently received input sample. The position of the trailing edge may be located at the position of the least recently received input sample included in the window based on the window size. For example, referring again to FIG. 3, the figure shows a window (window 302) of size 4. Thus, the fourth most recently received input sample, input sample 304, is included within the window. The position of the trailing edge of the window would be located at the position of input sample 304.

In certain embodiments, a number of iterations, defined herein as N, of the fairing process may be performed on the input samples within W after each new input sample is added. This fairs the samples within W while keeping the endpoints $w_0$ and $w_{w-1}$ fixed. In some embodiments, a value of N=10 may be used.

Figure 4:
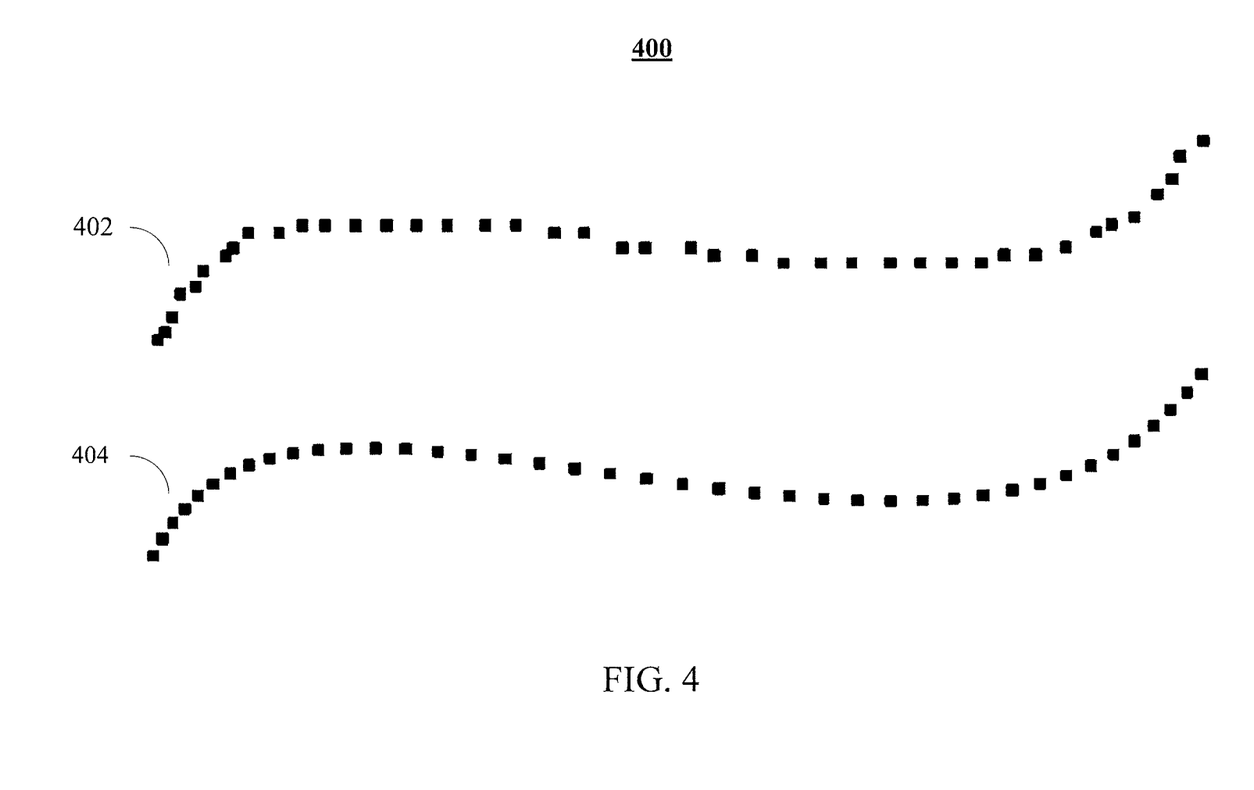
FIG. 4 is an illustration comparing an exemplary set of noisy input samples and the same set of input samples following noise filtering.

FIG. 4 shows an exemplary result of the fairing process for a set of noisy and quantized input samples. In particular, FIG. 4 shows a set 402, which includes a range of noisy and quantized input samples prior to noise filtering. FIG. 4 additionally shows a set 404, which includes a range of the same samples following the noise filtering process described herein. Set 404 better represents the intent of the user since high-frequency artifacts introduced by the input device have been removed while still accurately representing the overall shape of set 402.

B-Spline Subdivision

At step 206, processor 160 performs a process for generating a vector representation based on the filtered input samples. For example, processor 106 can utilize a J-spline (i.e. generalized B-splines) subdivision process for open curves (see, for example, [Rossignac]) to produce a B-spline for the entire set of samples being drawn. It should be appreciated, however, that any B-spline subdivision process may be utilized to produce any degree of B-spline. In order to make the subdivision process amenable to real-time feedback, processor 160 only performs the B-spline subdivision on those sections of the B-spline affected by input samples moved during the noise filtering process.

In some embodiments, processor 160 may determine that a B-spline section is affected based on the location of the B-spline's modified control vertices, i.e., the controls that a user can use to perhaps modify the B-spline. More specifically, when a particular control vertex of a quintic B-spline is modified, the modification affects the B-spline within a range of four adjacent control vertices. Thus, processor 160 can identify, at least in part, an affected section of a B-spline by determining the locations of a modified control vertex and the vertex's four adjacent control vertices. An affected B-spline section may include the section of a B-spline spanning the B-spline's control vertices and the four adjacent control vertices.

Following the identification of an affected B-spline section, processor 160 discards the section as no longer being valid. Processor 160 may thereafter compute a new B-spline spanning a range encompassing the discarded B-spline section as well as the most recently received input sample.

Figure 5:
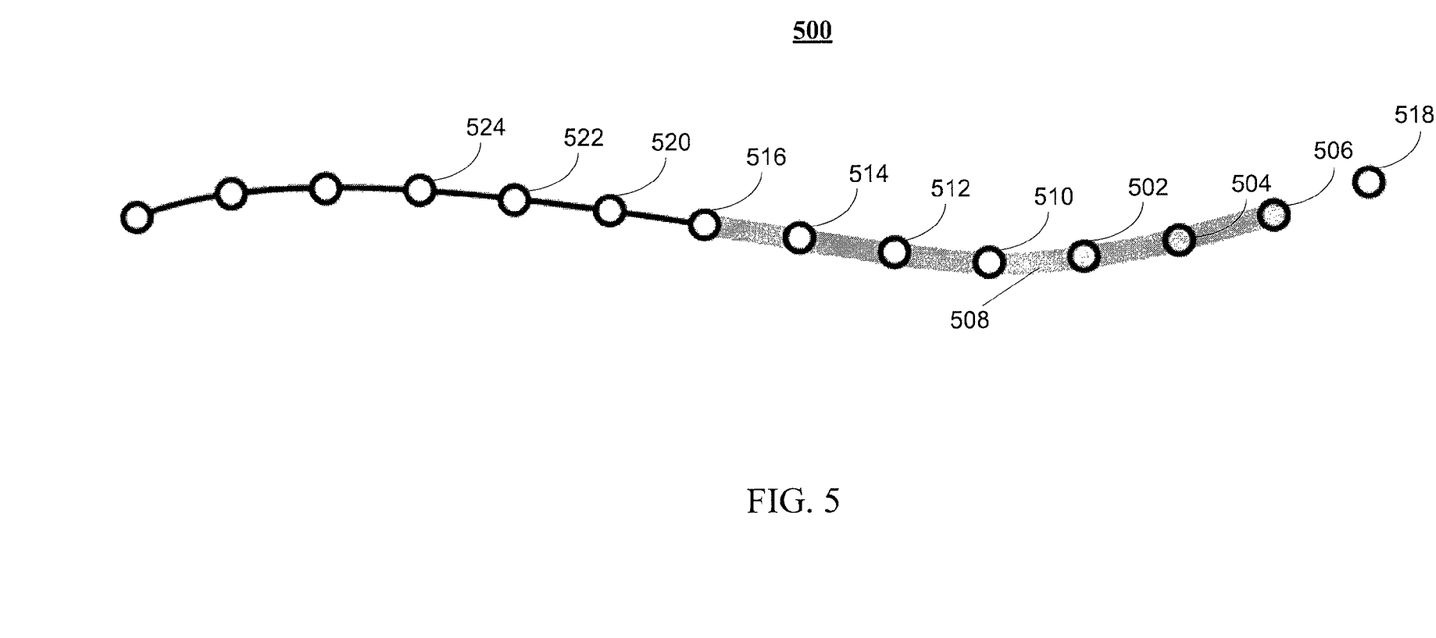
FIG. 5 is an illustration showing an exemplary set of input samples following noise filtering.

Illustratively, FIG. 5 shows a set of input samples following a noise filtering process. Three of the input samples (502, 504, and 506) in the set have been moved as a result of the noise filtering process. Because input sample 502 has been moved, it can be determined that a quintic B-spline section 508 (shown as the thickened curve), which spans a range including the four adjacent control vertices (input samples 510, 512, 514, and 516) of sample 502, has been affected. As a result, B-spline section 508 is discarded and a new B-spline section, which ranges from adjacent control vertex 516 to new input sample 518, is computed.

In some embodiments, processor 160 may also ensure that any additional input samples that have influence over the new replacement B-spline are included as control vertices. Referring again to FIG. 5, input samples 520, 522, and 524 may be considered control vertices. In certain embodiments, the range of control vertices may be the minimum necessary to compute a subdivision that smoothly connects to a pre-existing vector representation and retains continuity. Once computed, the section of the resulting B-spline spanning the previously discarded section may be used to replace the discarded section. At this point, the entire length of the vector representation is identical to the result achieved if the subdivision were done on the entire range of input samples.

Fairing Convergence Determination

At step 208, processor 160 determines whether to update the size of the adaptive analysis window W. In particular, processor 160 may determine that the size of the adaptive analysis window W is to be reduced if input samples in the window have converged. An input is considered to have converged if the sample has traveled less than a threshold, $T_w$, during the fairing process. In some embodiments, processor 160 examines input samples for convergence so long as $w > w_{min}$. In examining for convergence, processor 160 begins by analyzing $w_1$. If processor 160 determines that $w_1$ has converged, the analysis window size W is reduced by one and $w_1$ becomes $w_0$. Accordingly, the former $w_2$ becomes the new $w_1$. The new $w_1$ is thereafter checked for convergence. This process continues until either processor 160 determines that the current $w_1$ has not converged or when $w = w_{min}$.

Vector Representation Output

At step 210, processor 160 generates and outputs the vector representation to, for example, display/monitor 110 for presentation to a user. In some embodiments, the vector representation may be generated while a user continues to provide input (e.g., user is still drawing a curve, interacting with digital input device 140, etc.). Illustratively, a user may begin drawing a curve by moving a stylus pen along a tablet. As the user moves along the tablet, processor 160 may begin processing input samples and outputting a vector representation to monitor 110 as the user continues to draw. In doing so, the user is provided with immediate visual feedback of the vector representation.

Embodiments may also perform noise filtering and subdivision on other input dimensions. For example, processor 160 may additionally perform noise filtering and subdivision on inputs related to pen pressure and pen tilt and/or other components of the sample input.

Example of an Embodiment

FIGS. 6(a)-6(i) show the different processing stages performed on an exemplary set of input samples according to the process 200 shown in FIG. 2. In particular, FIGS. 6(a)-6(i) illustrates the processing that is performed on a set of input samples triggered by the receipt of a new input sample from digital input device 140.

Figures 6A, 6B, 6C, 6D, 6E, 6F, 6G, 6H, 6I:
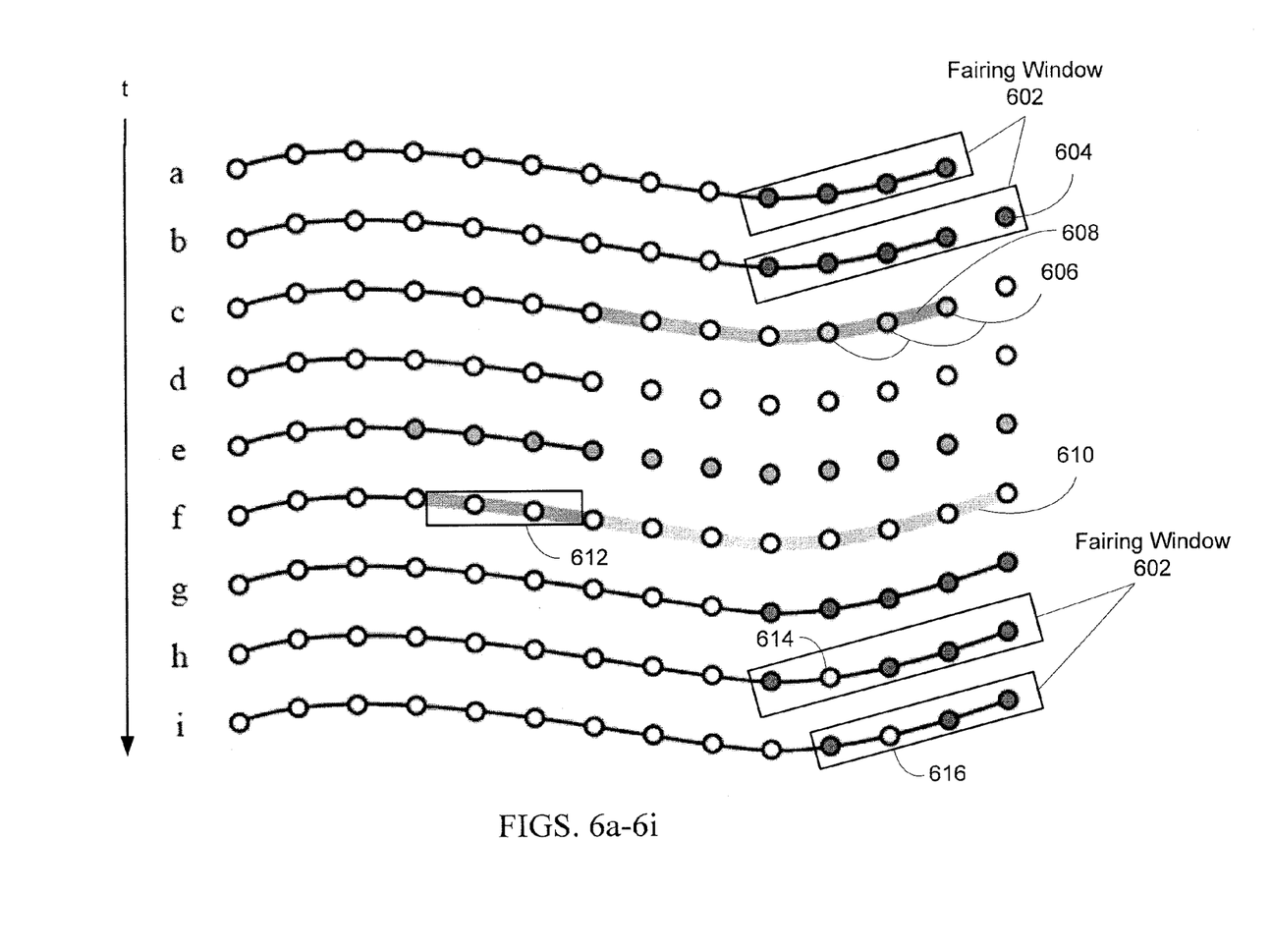

FIG. 6(a) shows a $C^4$ quintic B-spline and the input samples in an adaptive analysis window 602 prior to the receipt of a new input sample.

FIG. 6(b) shows the receipt of a new sample 604, which increases the window size of adaptive analysis window 602 by one.

FIG. 6(c) shows the results of a fairing process, which causes unfixed sample inputs 606 to move slightly. This movement affects section 608 (corresponding to the thickened curve section) of the B-spline.

FIG. 6(d) shows the B-spline following the removal of affected section 608. The removed section includes those portions that were influenced by the movement of sample inputs resulting from the fairing process.

FIG. 6(e) shows the control points (darkened circles) needed to compute a new B-spline to fill the empty region.

FIG. 6(f) shows a newly generated B-spline. Portion 612 of the thickened curve section 610 is identical to the portion of the previous B-spline section it replaced. However, the remaining portions of section 610 are new.

FIG. 6(g) shows a valid $C^4$ quintic B-spline, which again exists for the entire set of input samples.

FIG. 6(h) shows the input sample 614 ($w_1$), which has converged. Because input sample 614 has converged, the size of window 602 is reduced by one (i.e., reduces from five to four). The reduction in the size of window 602 is reflected in FIG. 6(i).

FIG. 6(i) shows the input sample 616 (new $w_1$), which has not converged. Because input sample 616 has not converged, the size of window 602 remains the same (i.e., remains at four). In instances where a sample is determined not to have converged, process 200 waits for a new input sample to be received. Thereafter, the process repeats.

Analysis of Results

The interactive, on-the-fly vectorization system described herein facilitates the generation of vector representations (e.g., B-spline curves) at any time during the input process, and thus supplies immediate feedback to a user. Even when compared to non-interactive approaches, embodiments produce competitive results in terms of smoothness and accuracy. In particular, not only are the vector representations smooth, but they are uniformly continuous along their entire lengths, which better represents human motion than previous piecewise-linear approaches.

Figure 7:
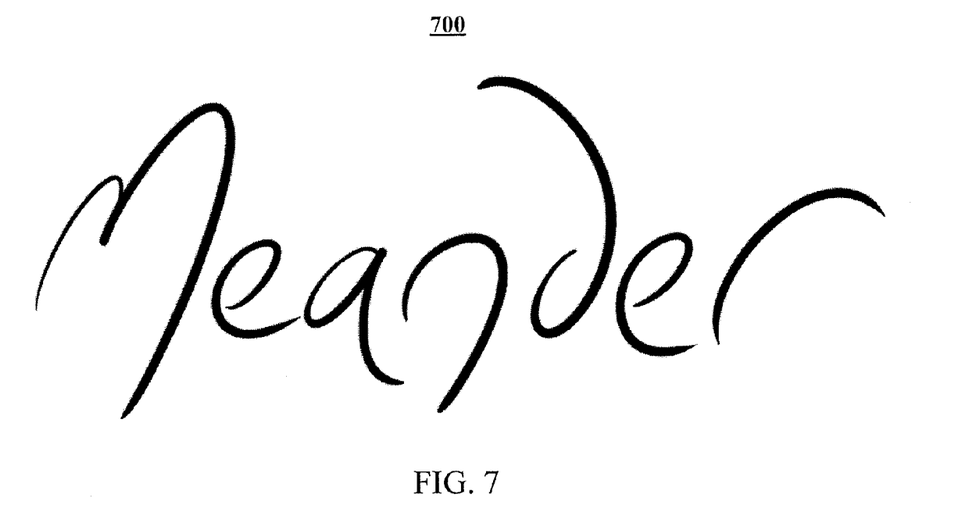
FIG. 7 is an illustration of an exemplary result generated by the system shown in FIG. 1.

FIG. 7 is an illustration of an exemplary result generated by the system shown in FIG. 1. In particular, FIG. 7 shows a vector representation generated based on hand-written input. In addition to being processed based on the filtering and subdivision of input points, pen pressure is also filtered and subdivided in order to produce a smooth variable-width vector representation. Although not shown, pen tilt is additionally filtered and subdivided during drawing, which can be used for additional pen rendering effects.

Figure 8:
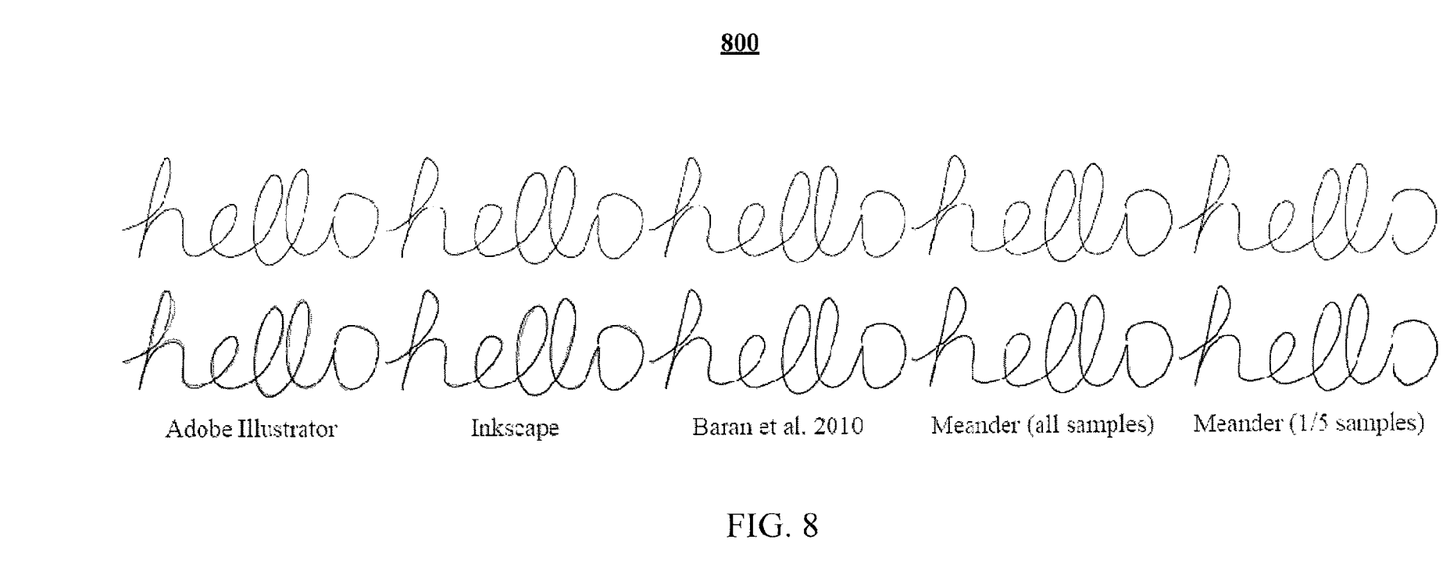
FIG. 8 is an illustration showing a comparison of results using multiple techniques on the same input data.

FIG. 8 shows a comparison of results generated by embodiments with results generated by the Adobe Illustrator™ program, by the Inkscape™ program, and by the algorithm described in [Baran]. In particular, FIG. 8 shows the final vector representations (top row) as well as the final vector representations on top of the unfiltered input curve (bottom row). Two results that are generated by an embodiment are shown: one with all input samples and one which uses every fifth input sample. With respect to the latter result, using fewer input samples reduces the impact of unclean inputs without comprising much with respect to accuracy.

Advantages of the result generated by the embodiment, as shown in FIG. 8, over the others include the higher degree continuity (up to $C^4$ when using J-splines) of the vector representation and the fact that the vector representation is produced as the user draws, thus providing immediate feedback.

Figure 9:
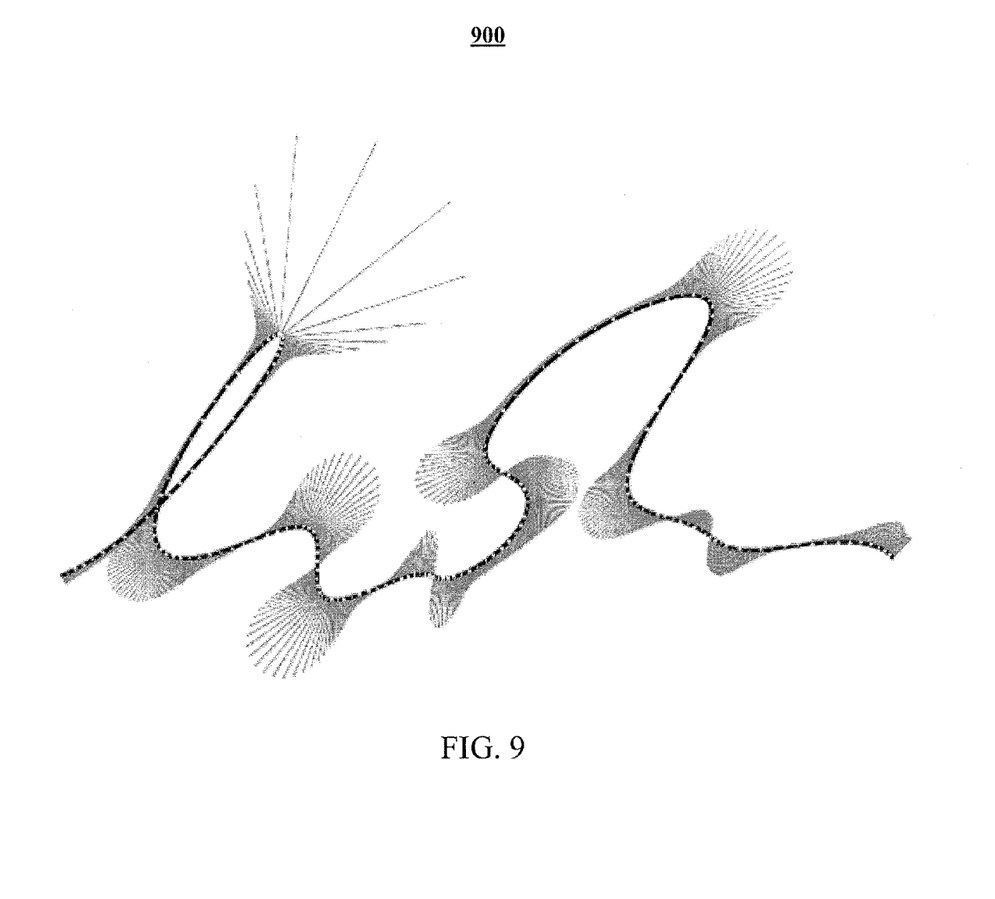
FIG. 9 is an illustration of a vector representation generated using the system shown in FIG. 1.

FIG. 9 shows an example result along with its input samples (dots within the vector representation) as well as its curvature profile. Although the B-spline subdivision algorithm may lead to a small amount of shrinking, it is negligible in practice. Because embodiments use subdivision vector representations, the final vector representation is not guaranteed to interpolate the control vertices. In practice, the discrepancy is often negligible due to sample density. In some embodiments, a retrofitting process may be adapted to explicitly bound the offset error from the control vertices. See, for example, [Rossignac].

While embodiments described herein are directed to planar curves, embodiments can be modified to be directed to any serialized data recorded by a digital input device, with any number of dimensions, such as motion capture data from a single motion tracker.

The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A method, using an electronic device or computer, for creating a vector representation of portions of an image from a set of input samples representing user physical inputs, the method comprising:
   receiving, from a digital input device, at least one input sample from the set of input samples;
   determining an analysis window to be used in the filtering of at least some of the set of input samples, wherein the analysis window contains the at least some of the set of input samples, wherein the analysis window has a leading edge and a trailing edge such that a size of the analysis window is a distance between the leading edge and the trailing edge, and wherein the determining includes at least determining a position for the trailing edge;
   filtering the at least some of the set of input samples based on the analysis window to generate a modified set of input samples;
   generating a vector representation based on the modified set of input samples;
   determining an updated size for the analysis window if the input samples within the window have moved less than a threshold distance during the filtering; and
   outputting the vector representation.

2. The method of claim 1, wherein the analysis window includes at least some of the most recently received input samples of the set of input samples.

3. The method of claim 2, wherein filtering based on the analysis window comprises filtering only those input samples within the analysis window.

4. The method of claim 1, wherein an input sample is a discrete input point.

5. The method of claim 1, wherein the digital input device is a device selected from the group consisting of a computer mouse, a trackball, a track pad, a stylus-based tablet, a digital pen, a joystick, a wireless remote, a touch screen, a voice command system, a three-dimensional input device, a force feedback device, an eye tracking system, and a three-dimensional tracking system.

6. The method of claim 1, wherein the filtering includes moving a position of at least one input sample in the at least some of the set of input samples; and
   wherein determining the updated size for the analysis window comprises:
   reducing the size of the analysis window if it is determined that the input samples have moved less than the threshold distance.

7. The method of claim 1, wherein the generating comprises using a B-spline subdivision process to generate the vector representation.

8. The method of claim 1, wherein the generating comprises:
   determining a section of a vector representation affected by the filtering;
   discarding the affected section of the vector representation; and
   computing a replacement section for the vector representation.

9. The method of claim 8, wherein a section is affected by the filtering if input samples associated with the section have moved as a result of the filtering.

10. The method of claim 1, wherein the filtering comprises a two-step Gaussian smoothing process.

11. The method of claim 10, wherein the two-pass Gaussian smoothing process comprises a first pass configured to move an input sample towards an average position of a set of neighbor input samples by a weight $\lambda$ and a second pass configured to move an input sample away from the average position of a set of neighbor input samples by a weight $\mu$.

12. A curve fitting system, using an electronic device or computer, for generating a vector representation of portions of an image from a set of input samples representing user physical inputs, comprising:
   a processor; and
   a memory device including instructions that, when executed by the processor, cause the processor to:
   receive, from a digital input device, at least one input sample from the set of input samples;
   determine an analysis window to be used in the filtering of at least some of the set of input samples, wherein the analysis window contains the at least some of the set of input samples, wherein the analysis window has a leading edge and a trailing edge such that a size of the analysis window is a distance between the leading edge and the trailing edge, and wherein the instructions that cause the processor to determine an analysis window, cause the processor to at least determine a position for the trailing edge;
   filter the at least some of the set of input samples based on the analysis window to generate a modified set of input samples;
   generate a vector representation based on the modified set of input samples;
   determine an updated size for the analysis window if the input samples within the window have moved less than a threshold distance during the filtering; and
   output the vector representation.

13. The system of claim 12, wherein the analysis window includes at least some of the most recently received input samples of the set of input samples.

14. The system of claim 12, wherein the instructions that cause the processor to filter cause the processor to filter only those input samples within the analysis window.

15. The system of claim 12, wherein the instructions that cause the processor to filter cause the processor to move a position of at least one input sample in the at least some of the set of input samples; and
   wherein the instructions that cause the processor to determine an updated size for the analysis window cause the processor to:
   reduce the size of the analysis window if it is determined that the input samples have moved less than the threshold distance.

16. The system of claim 12, wherein the instructions that cause the processor to generate a vector representation cause the processor to use a B-spline subdivision process to generate the vector representation.

17. The system of claim 12, wherein the instructions that cause the processor to generate a vector representation cause the processor to:
   determine a section of a vector representation affected by the filtering;
   discard the affected section of the vector representation; and
   compute a replacement section for the vector representation.

18. The system of claim 12, wherein the instructions that cause the processor to filter cause the processor to perform a two-step Gaussian smoothing process.

19. The system of claim 18, wherein the two-pass Gaussian smoothing process comprises a first pass configured to move an input sample towards an average position of a set of neighbor input samples by a weight $\lambda$ and a second pass configured to move an input sample away from the average position of a set of neighbor input samples by a weight $\mu$.

20. A non-transitory computer readable medium encoded with one or more computer readable instructions that, when executed by a processor, cause the processor to:
   receive, from a digital input device, at least one input sample from the set of input samples;
   determine an analysis window to be used in the filtering of at least some of the set of input samples, wherein the analysis window contains the at least some of the set of input samples, wherein the analysis window has a leading edge and a trailing edge such that a size of the analysis window is a distance between the leading edge and the trailing edge, and wherein the instructions that cause the processor to determine an analysis window, cause the processor to at least determine a position for the trailing edge;
   filter the at least some of the set of input samples based on the analysis window to generate a modified set of input samples;
   generate a vector representation based on the modified set of input samples;
   determine an updated size for the analysis window if the input samples within the window have moved less than a threshold distance during the filtering; and
   output the vector representation.

21. The computer readable medium of claim 20, wherein the instructions that cause the processor to filter based on the analysis window cause the processor to filter only those input samples within the analysis window.

22. The computer readable medium of claim 20, wherein the instructions that cause the processor to filter cause the processor to move a position of at least one input sample in the at least some of the set of input samples; and
   wherein the instructions that cause the processor to determine an updated size for the analysis window cause the processor to:
   reduce the size of the analysis window if it is determined that the input samples have moved less than the threshold distance.

23. The computer readable medium of claim 20, wherein the instructions that cause the processor to generate a vector representation cause the processor to:
   determine a section of a vector representation affected by the filtering;
   discard the affected section of the vector representation; and
   compute a replacement section for the vector representation.

24. The computer readable medium of claim 20, wherein an input sample includes position information, pressure information, and tilt information.

25. The computer readable medium of claim 20, wherein the instructions that cause the processor to filter cause the processor to perform a two-step Gaussian smoothing process.

\* \* \* \* \*